United States Patent [19]

Weirich

[11] Patent Number: 4,493,340
[45] Date of Patent: Jan. 15, 1985

[54] HYDRAULIC COUPLING

[75] Inventor: Walter Weirich, Dortmund, Fed. Rep. of Germany

[73] Assignee: Gewerkschaft Eisenhutte Westfalia, Lunen, Fed. Rep. of Germany

[21] Appl. No.: 430,179

[22] Filed: Sep. 30, 1982

[30] Foreign Application Priority Data

Oct. 20, 1981 [DE] Fed. Rep. of Germany ....... 3141475

[51] Int. Cl.³ ............................................. F16L 39/00
[52] U.S. Cl. .................................. 137/594; 137/322; 285/137 R
[58] Field of Search .................. 137/322, 594, 614.04; 285/25, 26, 28, 29, 137 R

[56] References Cited

U.S. PATENT DOCUMENTS

| 626,778 | 6/1899 | Tanney | 137/614.04 |
| 1,067,583 | 7/1913 | Brague | 137/322 |
| 2,359,648 | 10/1944 | Jones | 137/594 |
| 2,628,850 | 2/1953 | Summerville | 285/137 R X |
| 2,837,749 | 6/1958 | Gross | 137/614.04 X |
| 3,191,972 | 6/1965 | Collar | 137/614.04 X |
| 3,843,172 | 10/1974 | Stevens | 137/594 X |
| 3,851,666 | 12/1974 | Hammond | 137/614.04 |
| 4,378,124 | 3/1983 | Weirich et al. | 285/137 R |

Primary Examiner—Robert G. Nilson
Attorney, Agent, or Firm—Sughrue, Mion, Zinn, Macpeak and Seas

[57] ABSTRACT

A hydraulic coupling comprises a coupling device and a connector. The coupling device has a casing which houses a plurality of plug pins. The plug pins are held in place in the casing by means of a retaining disc. The connector is provided with a plurality of bores which define sockets for receiving the plug pins. When the coupling device and the connector are connected together, the plug pins and the bores define fluid passageways through the coupling. One of these passageways is provided with a non-return valve for preventing fluid flow through that passageway when the connector is separated from the coupling device. The non-return valve is housed within one of the bores of the connector, and the coupling device is provided with a valve-opening member for opening the non-return valve when the connector is attached to the coupling device.

8 Claims, 5 Drawing Figures

HYDRAULIC COUPLING

BACKGROUND TO THE INVENTION

This invention relates to a hydraulic coupling having a coupling device and a connector. The invention is particularly useful in the hydraulic distribution systems used in underground mine workings, particularly for hydraulically advanceable mine roof support assemblies and other hydraulic appliances.

Systems are known in which numerous hydraulic lines are bunched together to form multi-line hoses which are interconnected by means of generally cylindrical hydraulic couplings. A known hydraulic coupling of this type includes a coupling device having a plurality of plug pins, and a connector having a plurality of sockets which mate with the plug pins, the coupling device being attached to a multi-line hose, and the connector being attached to a plurality of single-line hoses. Multi-line hoses are used, for example, to supply pressurised hydraulic fluid to the individual hydraulic appliances of mine roof support units. In particular, the hydraulic props and the advance rams of the roof support units are pressurised in this way. (See DE-AS No. 2 066 052, DE-GM No. 80 02 198, and the journal "o-p-oelhydraulik and pneumatik, 1980; pages 597/598).

In what are called "neighbourhood" (or "proximity") systems for controlling the advance of self-advancing roof support units, the multi-line hoses are connected to the individual props and rams of each roof support unit by means of hydraulic couplings incorporating distributor members. For example, each hydraulic coupling may have a coupling device attached to a multi-line hose and a connector attached to the associated props and rams by single-line hoses, the connector constituting a distributor. The disadvantage of this known type of arrangement is that release of a hydraulic coupling (for example for the purpose of replacing the associated multi-line hose) inevitably leads to a reduction in the pressurisation of the associated props and rams. Clearly, in the case of the hydraulic props which hold up the roof of a mine working, this constitutes a considerable danger to face workers.

The aim of the invention is to provide a hydraulic coupling which does not suffer from this disadvantage; and which can achieve control of load in a simple and reliable manner without complicating the design (or substantially increasing the cost) of such a coupling.

SUMMARY OF THE INVENTION

The present invention provides a hydraulic coupling comprising a coupling device and a connector, the coupling device comprising a casing, a plurality of plug pins housed within the casing, and a holder for holding the plug pins, and the connector having a plurality of sockets, the plug pins each being connectible to a respective line of a multi-line hose and the plug pins each being engageable within a respective socket of the connector thereby defining a respective fluid passageway, wherein one of the passageways is provided with a non-return valve for preventing fluid flow through that passageway when the connector is separated from the coupling device.

Advantageously, the coupling further comprises a device for opening the non-return valve when the connector is coupled to the coupling device. Each of the sockets may constitute part of a respective bore passing through the connector. Preferably, the non-return valve is positioned within the bore which defines part of the passageway associated with the valve. Conveniently, the valve-opening device forms part of the coupling device.

Thus, when the coupling device is secured to the connector, the valve opening device opens the non-return valve so that the hydraulic appliance associated with the bore containing the non-return valve is supplied with pressurised hydraulic fluid. On the other hand, when the hydraulic coupling is released, the non-return valve is automatically closed, so that the associated hydraulic appliance is hydraulically locked, thereby preventing any substantial reduction in pressurisation.

Advantageously, the valve-opening device is constituted by the plug pin which mates with the socket forming part of the passageway containing the non-return valve. Preferably, said plug pin is longer than the other plug pins. Conveniently, said plug pin constitutes an alignment pin for accurately aligning all the plug pins within the corresponding sockets of the connector.

Alternatively, the valve-opening device may be a pin or a cam provided on the holder of the coupling device.

In a preferred embodiment, the non-return valve is a plunger-actuated valve, the plunger of which is positioned within the bore which defines part of the passageway associated with the valve, and the plunger being engageable with the valve-opening device. Advantageously, the plunger is carried by a piston which is reciprocably mounted within said bore, the piston being provided with at least one axially-extending recess for permitting the through flow of hydraulic fluid. Preferably, the piston is of cruciform cross-section.

Preferably, the connector has an angled body portion, and the bores passing through the connector are angled bores, each of which terminates at the end faces of the connector, the end faces of the connector being angled relative to one another. Advantageously, that part of the bore which contains the non-return valve extends beyond the apex of that angled bore, said extension passing right through the connector and constituting an entrance through which the non-return valve can be introduced into said bore.

Conveniently, the coupling device and the connector are provided with complementary screw threads.

In the case of hydraulic roof support systems, it generally suffices if a non-return valve is provided only in the line leading to one prop or group of props. In some cases, however, it is preferable for a respective non-return valve to be provided in at least two of the passageways, each non-return valve being effective to prevent fluid flow through that passageway when the connector is separated from the coupling device, and each non-return valve being associated with a respective valve-opening device.

Preferably, the or each non-return valve has a closure member which is spring biased towards its closed position.

BRIEF DESCRIPTION OF THE DRAWINGS

A hydraulic coupling constructed in accordance with the invention will now be described in detail, by way of example, with reference to the accompanying drawings, in which.

DESCRIPTION OF PREFERRED EMBODIMENT

Figure 1:
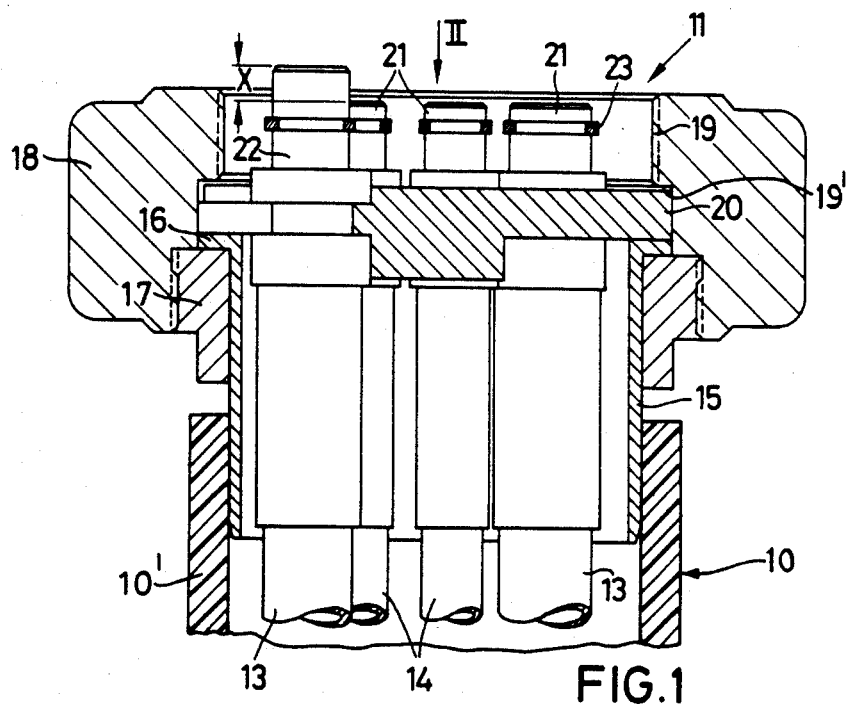
FIG. 1 is a part-sectional side elevation of a coupling device which forms part of the hydraulic coupling.
Figure 2:
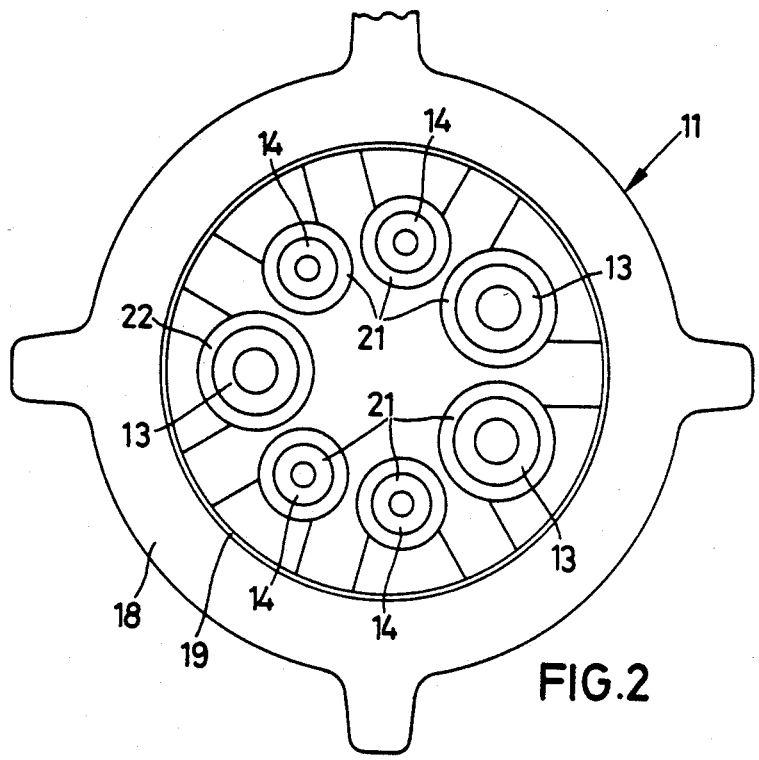
FIG. 2 is a view, looking in the direction of the arrow II shown in FIG. 1 of the coupling device.
Figure 3:
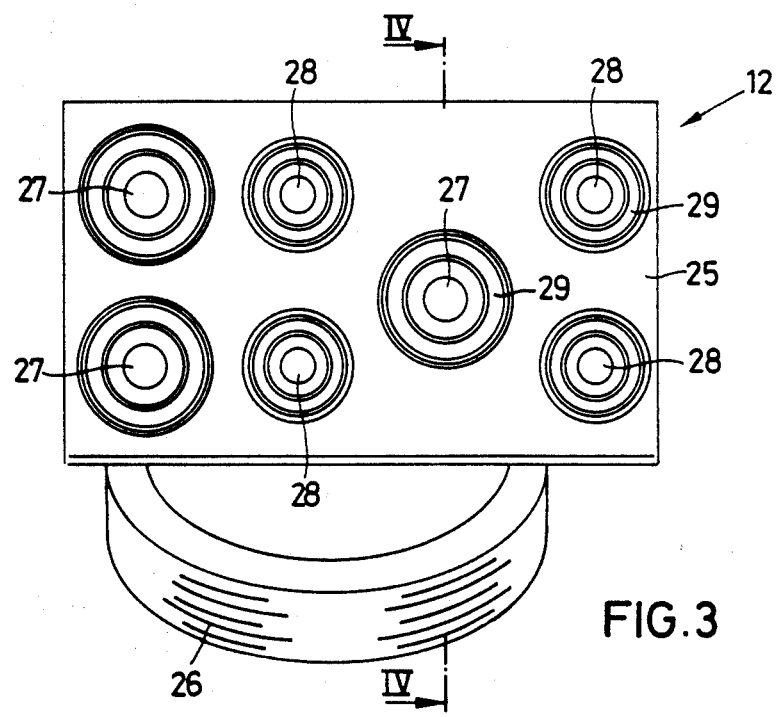
FIG. 3 is an end elevation of a connector which together with the coupling device constitutes the hydraulic coupling.
Figure 4:
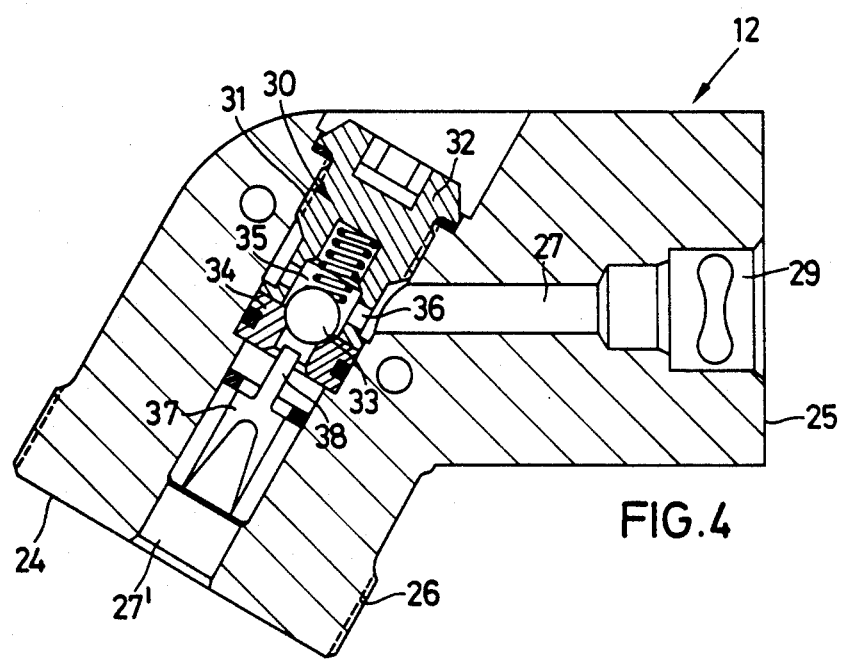
FIG. 4 is a cross-section taken on the line IV—IV of FIG. 3.

The illustrated hydraulic coupling is constituted by a coupling device II (see FIGS. 1 and 2) and a connector 12 (see FIGS. 3 and 4). As shown in FIG. 1, a multi-line hose 10 is connected to the coupling device 11, the multi-line hose being constituted by a plurality of flexible conduits 13 and 14 bunched together within a flexible sheath 10'. There are three conduits 13 and four conduits 14, the conduits 13 having larger inside and outside diameters than the conduits 14. Two of the conduits 13 are intended to supply pressurised hydraulic fluid to the hydraulic props of a mine roof support unit (not shown), and the third conduit 13 is intended to supply pressurised hydraulic fluid to the advance ram of that unit. Where the roof support unit has two props, each prop is pressurised by a respective conduit 13; whereas, where the unit has four props, each prop-supply conduit 13 pressurises a respective pair of props. The four conduits 14 are intended to supply pressurised hydraulic fluid to other hydraulic appliances of the roof support unit, such as roof bar extension rams, alignment rams and control rams.

The coupling device 11 is attached to a rigid metal sleeve 15 which is force-fitted within the adjacent end of the hose 10. The metal sleeve 15 has an outwardly-extending flange 16 at its free end. An externally-threaded collar 17 is force-fitted over the metal sleeve 15 so as to rest against the flange 16. A cap nut 18, which constitutes a housing of the coupling device 11, is mounted on the external threads of the collar 17 by means of complementary internal threads. The cap nut 18 is formed with an internal screw thread 19.

A holder (retaining disc) 20 is loosely held within the cap nut 18 between the flange 16 and an internal shoulder 19'. The holder 20 supports plug pins 21 and 22 which are fitted to the free ends of the conduits 13 and 14. There are six plug pins 21 and a single plug pin 22. The plug pin 22 is connected to one of the larger conduits 13, and is longer than the plug pins 21 by a distance X (see FIG. 1). The plug pin 22 is connected to one of the conduits 13 which is intended to supply hydraulic fluid to one or more of the hydraulic props of the associated roof support unit. Each of the plug pins 21 and 22 is provided with an O-ring seal 23.

The connector 12 (see FIGS. 3 and 4) is in the form of an angled distributor, and has end faces 24 and 25 set at an angle to one another. The connector 12 is provided with an external screw thread 26 adjacent to its end face 24, this screw thread being complementary to the internal screw thread 19 of the cap nut 18. Thus, the connector 12 can be screwed onto the coupling device 11 to complete the hydraulic coupling.

The connector 12 is formed with a plurality of angled bores 27 and 28 which extend from the inlet end face 24 to the discharge end face 25. There are three bores 27 and four bores 28, the bores 27 being connectible to the conduits 13 and the bores 28 being connectible to the conduits 14. The portions of the bores 27 and 28 adjacent to the inlet end face 24 define sockets for receiving the free end portions of the plug pins 21 and 22. The bores 27 and 28 have diameters which correspond to the diameters of the associated conduits 13 and 14. As shown in FIG. 3, the discharge end face 25 of the connector 12 is of rectangular configuration. Moreover, each of the bores 27 and 28 terminates in a socket 29 which is sized to receive a standard plug pin (not shown). Each of the standard plug pins is secured to the connector by a U-shaped clip (not shown), and is connected to the associated hydraulic ram or prop by means of a respective single line hose.

A non-return valve 30 is disposed within that one of the three larger diameter bores 27 which, in use, mates with the plug pin 22 of the coupling device 11. The non-return valve 30 is fitted into a branch 27' of that bore, the branch 27' extending from the inlet end face 24 and straight through the connector 12 (see FIG. 4). The non-return valve 30, which is of stepped construction, is fitted into the bore branch 27' from the end opposite to the end face 24. The valve 30 has a sleeve-like body 32 having an external screw thread 31 by means of which the valve is screwed into the bore branch 27'. A ball 33, which constitutes a valve closure member, is disposed within the sleeve 32. In its closed position, the ball 33 lies against a valve seat 34 formed within the sleeve 32. The ball 33 is urged towards its closed position by a spring 35. The sleeve 32 is formed with a plurality of radial bores 36 which establish fluid communication with the discharge branch of the associated bore 27. A piston 37 is slidably mounted within the bore branch 27' between the valve 30 and the inlet end face 24. The piston 37 is of cruciform cross-section, and carries an axially-extending plunger 38 which is engageable with the ball 33. The cruciform design of the piston 37 enables pressurised hydraulic fluid to pass along the bore branch 27' to the non-return valve 30.

When the hydraulic coupling is broken, that is to say when the coupling device 11 is separated from the connector 12, the non-return valve 30 is closed. This is because the plug pin 22 is no longer present to prevent the ball 33 pushing the plunger 38 and the piston 37 towards the end face 24 until the ball engages its seat 34 to close the valve 30. The ball 33 moves back to its closed position under the action of the spring 35 and/or under the action of hydraulic back pressure in the line leading from the associated hydraulic prop(s). As the valve 30 is closed, the associated hydraulic prop(s) is (or are) hydraulically locked, that is to say it (or they) is (or are) maintained fully pressurised, so that prop retraction is prevented. This ensures that, when the hydraulic coupling is released, the associated roof support unit does not lose its resistance to yielding, but remains braced between the roof and the floor of a mine working.

When the hydraulic coupling is assembled, by screwing the cap nut 18 of the coupling device 11 onto the thread 26 of the connector 12, the plug pins 21 and 22 are drawn into the socket portions of the bores 27 and 28, thereby establishing hydraulic connections between the conduits 13 and 14 and the bores 27 and 28. As this occurs, the plug pin 22 pushes the piston 37 up the bore branch 27'. This causes the plunger 38 to lift the ball 33 away from the valve seat 34 (against the biasing force of the spring 35), thus opening the non-return valve 30. Consequently, when the hydraulic coupling is assembled, the hydraulically-locked prop(s) is (or are) automatically resupplied with pressurised hydraulic fluid via the opening non-return valve 30.

Figure 5:
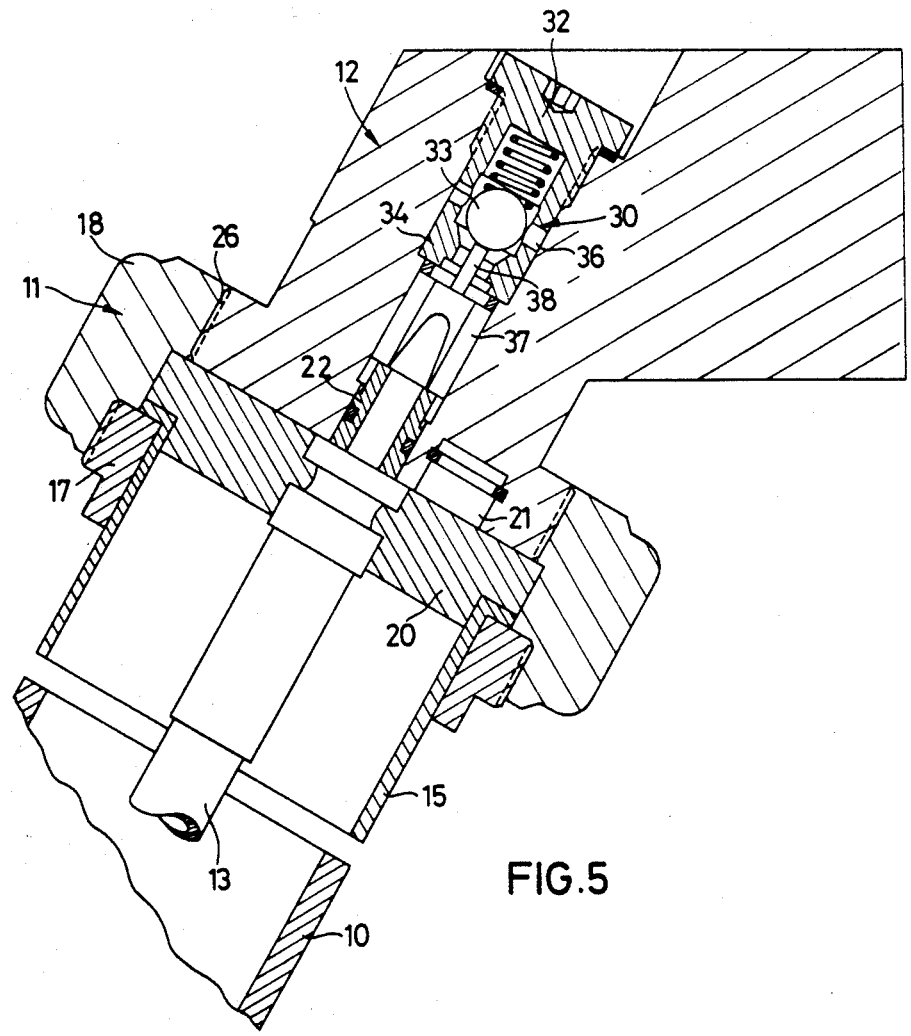
FIG. 5 is a simplified part-sectional side elevation of the hydraulic coupling.

FIG. 5 illustrates the assembled hydraulic coupling in a simplified manner. In particular, only one conduit 13 of the multi-line hose 10 is shown together with the associated bore 27 of the connector 12. It will be understood that non-return valves could be provided in two or more of the bores 27, so that two or more hydraulic appliances could be hydraulically locked when the coupling is separated.

The plug pin 22, which acts as a valve-opening device, could also be used as an alignment member for aligning all the plug pins 21 and 22 with their respective bores 27 and 28.

I claim:

1. A hydraulic coupling for advanceable roof support assemblies and the like in an underground mine working, comprising, in combination, a coupling device (II) and a connector (12), the coupling device comprising a casing (15, 17, 18), a holder (20) disposed within the casing, a plurality of plug pins (21, 22) held by the holder and housed within the casing, and the connector having a plurality of sockets (27, 28), the plug pins each being connected to a respective line (13, 14) of a multi-line hose (10) and the plug pins each being engageable within a socket of the connector to define a plurality of fluid passageways, wherein one of the passageways is provided with a non-return valve (30) for preventing fluid flow through said one passageway when the connector is separated from the coupling device, wherein each of the sockets constitutes part of a respective bore passing through the connector, wherein the non-return valve is positioned within a bore which defines part of the passageway associated with the valve, wherein one of the plug pins (22) is longer than the other plug pins and forms a valve-opening device which mates with the socket forming part of the passageway containing the non-return valve when the connector is joined to the coupling device, wherein said one plug pin constitutes an alignment pin for accurately aligning all of the plug pins within corresponding sockets of the connector, and wherein the non-return valve comprises an actuating plunger (37, 38) positioned within the bore which defines part of the passageway associated with the valve, the plunger being engageable with said one plug pin when the connector is joined to the coupling device.

2. A hydraulic coupling according to claim 1, wherein the plunger is carried by a piston which is reciprocably mounted within said bore, the piston being provided with at least one axially-extending recess for permitting the through flow of hydraulic fluid.

3. A hydraulic coupling according to claim 2, wherein the piston is of cruciform cross-section.

4. A hydraulic coupling according to claim 1, wherein the connector has an angled body portion.

5. A hydraulic coupling according to claim 4, wherein the bores passing through the connector are angled bores, each of which terminates at the end faces of the connector, the end faces of the connector being angled relative to one another.

6. A hydraulic coupling according to claim 5, wherein that part of the bore which contains the non-return valve extends beyond the apex of that angled bore, said extension passing right through the connector and constituting an entrace through which the non-return valve can be introduced into said bore.

7. A hydraulic coupling according to claim 1, wherein the coupling device and the connector are provided with complementary screw threads.

8. A hydraulic coupling according to claim 1, wherein the non-return valve has a closure member which is spring biased towards its closed position.

* * * * *